United States Patent
Bodart et al.

(10) Patent No.: US 7,745,551 B2
(45) Date of Patent: Jun. 29, 2010

(54) LOW GEL CHROMIUM CATALYSIS

(75) Inventors: Philippe Bodart, Clermont sous Huy (BE); Philippe Marechal, Grez-Doiceau (BE); Eric Damme, Arquennes (BE)

(73) Assignee: Total Petrochemicals Research Feluy, Feluy (BE)

( * ) Notice: Subject to any disclaimer, the term of this patent is extended or adjusted under 35 U.S.C. 154(b) by 386 days.

(21) Appl. No.: 11/501,183

(22) PCT Filed: Feb. 8, 2005

(86) PCT No.: PCT/EP2005/050523

§ 371 (c)(1),
(2), (4) Date: Feb. 19, 2008

(87) PCT Pub. No.: WO2005/082944

PCT Pub. Date: Sep. 9, 2005

(65) Prior Publication Data

US 2008/0255323 A1    Oct. 16, 2008

(30) Foreign Application Priority Data

Feb. 13, 2004    (EP) .................. 04100587

(51) Int. Cl.
  C08F 2/12    (2006.01)
  C08F 4/69    (2006.01)
  C08F 210/14    (2006.01)
(52) U.S. Cl. .................. 526/64; 526/65; 526/105; 526/106
(58) Field of Classification Search .................. 526/64, 526/65, 105, 106
  See application file for complete search history.

(56) References Cited

U.S. PATENT DOCUMENTS

| 2,917,465 A | 12/1959 | Begley |
| 6,063,878 A | 5/2000 | Vandaele |
| 2003/0114608 A1 | 6/2003 | Tharappel |

FOREIGN PATENT DOCUMENTS

EP    1041096    10/2000

*Primary Examiner*—Fred M Teskin
(74) *Attorney, Agent, or Firm*—Tenley R. Krueger

(57) ABSTRACT

The present invention discloses the use of a chromium-based catalyst system in two serially connected loop reactors for copolymerising ethylene and a comonomer, at reduced productivity, the final polyethylene having a reduced amount of gel.

11 Claims, 3 Drawing Sheets

LOW GEL CHROMIUM CATALYSIS

The present invention discloses a method for reducing gel content in polymers prepared with chromium-based catalyst systems without reducing the throughput by using a double loop reactor.

Polyethylene is known for use in the manufacture of a wide variety of articles. The polyethylene polymerisation process can be varied in a number of respects to produce a wide variety of resultant polyethylene resins having different physical properties which render the various resins suitable for use in different applications. In particular, it is known to use polyethylene for use in applications where the polyethylene is required to have crack resistance, both resistance to rapid and to slow crack growth. It is also known to use polyethylene in the manufacture of films where the polyethylene preferably has a low gel content.

It is known in the art that the physical properties, in particular the mechanical properties, of a polyethylene product can vary depending on what catalytic system was employed to make the polyethylene. This is because different catalyst systems tend to yield different molecular weight distributions in the polyethylene produced.

For example, EP-A-0829495, EP-A-946611 and EP-A-946612 all disclose processes for producing polyethylene, these processes comprising copolymerising ethylene and an alpha-olefinic comonomer comprising from 3 to 8 carbon atoms, in the presence of a chromium-based catalyst in a first reactor to produce a first polyethylene copolymer product having a first melt index and a first molecular weight distribution, feeding the first polyethylene copolymer product thereby produced and the chromium-based catalyst to a second reactor, and in the second reactor copolymerising ethylene and an alpha-olefinic comonomer comprising from 3 to 8 carbon atoms, in the presence of the chromium-based catalyst under different polymerisation conditions to produce a second polyethylene copolymer product having a second melt index and a second molecular weight distribution.

In many prior art polymerisation processes, the amount of gel is controlled at the expense of throughput higher residence time is resulting in higher productivity and lower gel content, at the expense of throughput.

In a single loop reactor, low gel content can be obtained by reducing the throughput for given polymerisation conditions. Alternatively, the activity of the catalyst system can be modified either by increasing the amount of triethylaluminium leading to resins having uncontrollable melt index, or by increasing the temperature, leading to resins having poor mechanical properties.

It is an aim of the present invention to reduce the amount of gel in the final polyethylene.

It is another aim of the present invention to retain the throughput in the polymerisation process.

Accordingly, the present invention discloses the use of a chromium-based catalyst system, in two serially connected loop reactors, for the homopolymerisation of ethylene or for the copolymerisation of ethylene with one or more comonomers, to produce at reduced productivity and thus at high throughput, a polyethylene resin having reduced heterogeneity.

The polymer fractions produced in each reactor are of the same nature: either they are both homopolymers or they are both copolymers. Preferably they are copolymers. Preferably, the polyethylene is a copolymer of ethylene and the comonomer is an alpha-olefin having from 3 to 8 carbon atoms.

The polyethylene resin can be used to prepare films having reduced gel content.

The productivity is less than 3500, preferably less than 2500 grams of polymer per gram of supported chromium-based catalyst component and the gel content is preferably of at most 30 ppm or of at most 600 per $m^2$ The chromium based catalyst component is not particularly limited and can be any chromium-based catalyst system disclosed in prior art such as for example the chromium-based catalyst component supported on a silica-titania support disclosed in EP-A-905145 or such as a chromium-based catalyst component supported on a silica support.

Preferably the chromium-based catalyst comprises a supported chromium oxide catalyst having a titania-containing support, for example a composite silica and titania support. A particularly preferred chromium-based catalyst component may comprise from 0.5 to 5 wt % chromium, preferably around 1 wt % chromium, such as 0.9 wt % chromium based on the weight of the chromium-containing catalyst. The support comprises at least 1 wt % titanium, preferably around 2 to 3 wt % titanium, more preferably around 2.3 wt % titanium based on the weight of the chromium containing catalyst. The chromium-based catalyst may have a specific surface area of from 200 to 700 $m^2/g$, preferably from 400 to 550 $m^2/g$ and a pore volume of greater than 1.8 cc/g preferably from 2 to 3 cc/g.

A particularly preferred chromium-based catalyst ("Catalyst 1") for use in the present invention comprises a catalyst which has an average pore radius of 190 A, a pore volume of around 2.1 cc/g, a specific surface area of around 510 $m^2/g$ and a chromium content of around 0.9 wt % based on the weight of the chromium containing catalyst. The support comprises a composite silica and titania support. The amount of titania in the support provides that the catalyst as a whole comprises around 2.3 wt % titanium.

The catalyst may be subjected to an initial activation step in air at an elevated activation temperature. The activation temperature preferably ranges from 500 to 850° C., more preferably 600 to 750° C.

In order to enhance the degree of comonomer incorporation into the polyethylene resin (thereby to lower the density of the resin), the catalyst preferably has a high surface area, preferably greater than 400 $m^2/g$, a large pore volume, preferably larger than 1.8 cc/g, and it may or may not be fluorinated prior to activation. If it is fluorinated, it has a fluorine content of around 1 wt %.

One or more organoaluminium compounds can be used as co-catalysts. An organoaluminium represented by the formula $AIR_3$ can be used wherein each R is the same or different and is selected from halides or from alkoxy or alkyl groups having from 1 to 12 carbon atoms. Especially suitable aluminium alkyls are trialkylaluminium, the most employed being triethylaluminium (TEAL).

In the first loop reactor, preferably ethylene monomer and an alpha-olefinic comonomer comprising from 3 to 8 carbon atoms are fed thereinto in the liquid phase, typically in an inert diluent, preferably isobutane, together with a chromium-based catalyst. Typically, the copolymerisation is performed at a temperature of from 90 to 105° C., more typically around 100° C., and at a pressure of from 20 to 60 bars, more typically around 42 bars. A diluent under supercritical conditions may also be employed in the polymerisation process, wherein the pressure of the supercritical diluent is of from 37 to 100 bars and the temperature of from 70 to 140° C.

The comonomer preferably comprises 1-hexene, but may alternatively comprise any one or more of 1-butene, 1-pentene, 4-methyl-1-pentene, 1-heptene or 1-octene.

Typically, the ethylene monomer comprises from 2 to 10% by weight and the comonomer comprises from 0.2 to 4% by weight, each based on the total weight of the monomer and comonomer in the inert diluent. A typical polymerisation medium may for example comprise, in an inert diluent such as for example isobutane, an ethylene flow of from 2 to 10 wt %, and a 1-hexene flow of up to 4 wt %.

In the first loop reactor, a first polyethylene resin is produced by copolymerisation of the ethylene and the comonomer. In accordance with the preferred process, in the first loop reactor the process variables such as the ethylene flow rate and the temperature are controlled so as to produce a polyethylene resin having a specified high load melt index (HLMI) yielding the required mechanical properties of the resin. Typically, the HLMI ranges from 5 to 35 g/10 min, and is most typically from 8 to 25 g/10 min. The high load melt index is determined using the procedures of ASTM D1238 using a load of 21.6 kg at a temperature of 190° C. The HLMI is broadly inversely indicative of the molecular weight of the polymer. In other words, a low melt index is indicative of a high molecular weight for the polyethylene, and vice versa. The amount of comonomer fed to the first reactor controls the density of the polyethylene fraction produced in said first reactor.

The first polyethylene product, together with unreacted ethylene and comonomer in the inert diluent, is fed to the second loop reactor serially connected thereto and additional monomer (ethylene) and comonomer are fed into the second reactor. The same chromium-based catalyst is present in the second reactor as in the first reactor. In the second loop reactor, the process parameters are varied to produce therein a second polyethylene product having other properties. The properties of the first and second polyethylene resins are selected in order to obtain a final polyethylene resin that has the desired properties. The final polyethylene resin can have a monomodal or a broad or bimodal molecular weight distribution. The molecular weight distribution is defined by the polydispersity index D that is the ratio Mw/Mn of the weight average molecular weight Mw to the number average molecular weight Mn. In order to obtain a monomodal molecular weight distribution, the operating conditions are substantially the same in both reactors. A broad molecular weight distribution on the contrary requires different operating conditions in both reactors.

The polyethylene products prepared according to the present invention are characterised by very low heterogeneity; They can be used to prepare films having a very low gel content. The gel content in a film is measured by the number of gels per m$^2$ of film, or by the amount of gel defined as the portion of the film surface covered by gel expressed as part per million of surface covered with gel (ppm), and by the mean gel size. A small mean gel size is also observed. It is known in the art that the amount of gel decreases with increasing productivity. Typically low catalyst productivity is a consequence of low residence time. In order to increase the plant output, it is desired to reduce the residence time and therefore the productivity, thereby increasing the amount of gel, which is unavoidable in a single loop reactor The present invention provides a process whereby the amount of gel is substantially decreased even at low productivity and thus at high plant throughput, by using two serially connected loop reactors. This can be seen in FIG. 1 that represents the amount of gel expressed in ppm as a function of productivity expressed in grams of polyethylene per gram of catalyst for a resin prepared in a double loop reactor, for a resin exiting the first reactor and for a prior art resin. It is observed on that Figure that, at equivalent productivity, the resins of the present invention have a significantly lower gel content than the prior art resins, at same productivity. The amount of gel contained in the final polyethylene film is at most 30 ppm. More importantly, at same productivity, the amount of gel is substantially reduced.

These polyethylene resins can be used to prepare films, fibres or bottles with low gel content.

The low gel polyethylene resins of the present invention are suitable for preparing films.

LIST OF FIGURES

EXAMPLES

Figure 1:
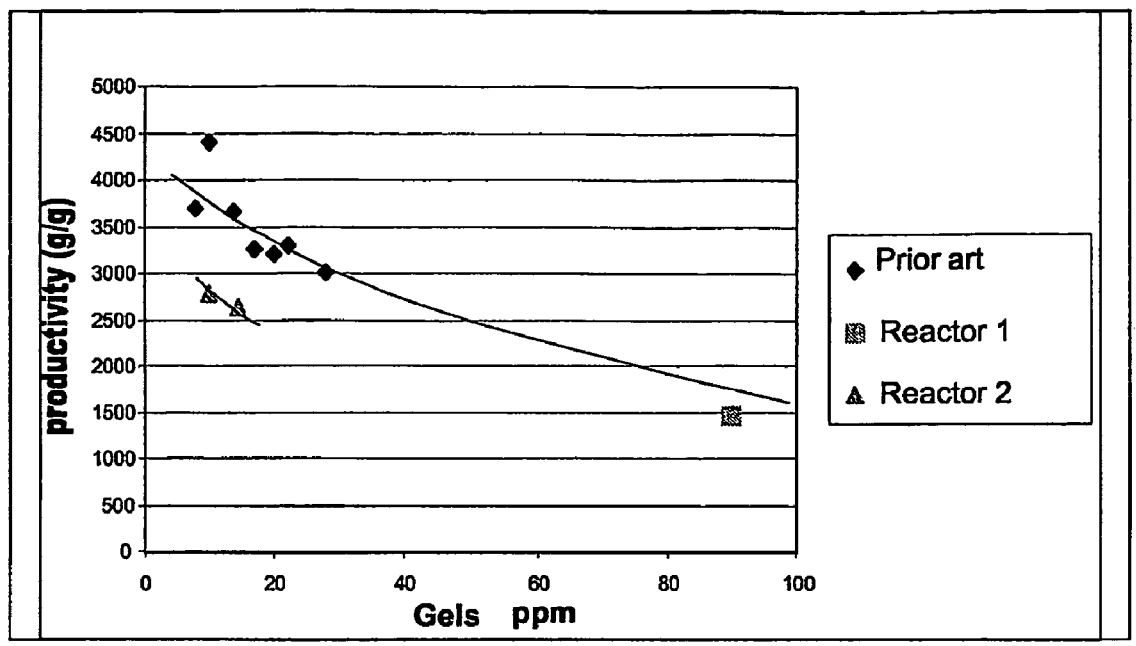
FIG. 1 represents the amount of gel expressed in ppm as a function of productivity expressed in grams of polyethylene per gram of catalyst, for a resin prepared in a double loop reactor, for a resin exiting the first reactor and a prior art resin.

The commercial catalyst Magnapore 963 produced by Grace Davison was fluorinated using $NH_4BF_4$ in order to contain 1 wt % of fluor. It was then activated by heating at a temperature of 635° C. The cocatalyst was triethylaluminium (TEAL): it was introduced in the first reactor with the chromium-based catalyst in amounts specified in table I. No TEAL was added in the second reactor.

Final resins R1 and R3 were prepared using the same conditions in both reactors: they had a monomodal polydispersity.

Final resins R2 and R4 were prepared using different reactor conditions, targeting reduced hexene incorporation in the low molecular weight species produced in the first reactor. They had a broad polydispersity.

The production conditions for resins R1 to R4 are summarised in Table I.

TABLE I

| | First reactor | | | | | | |
|---|---|---|---|---|---|---|---|
| Resin | C2-% | C6-% | TEAL ppm | Res. t. min | T ° C. | Pr. rate Kg/h | % in R1 |
| R1 | 3.65 | 0.64 | 1.3 | 65.4 | 91 | 25.3 | 54 |
| R2 | 5.51 | 0.44 | 1.2 | 66.6 | 96 | 24.5 | 53 |
| R3 | 7.6 | 0.23 | 1.2 | 69 | 98 | 23.5 | 54 |
| R4 | 6.26 | 0.28 | 1.2 | 67.8 | 102 | 24 | 53 |

| | Second reactor | | | | | |
|---|---|---|---|---|---|---|
| Resin | C2-% | C6-% | Res. t. min | T ° C. | Pr. rate Kg/h | % in R2 |
| R1 | 2.41 | 0.36 | 28.56 | 91 | 21.4 | 46 |
| R2 | 3.08 | 0.66 | 28.32 | 90 | 21.6 | 47 |
| R3 | 5.79 | 0.13 | 32.16 | 98 | 20.1 | 46 |
| R4 | 3.12 | 0.18 | 25.44 | 95 | 21.4 | 47 |

The characteristics of the resins are summarised in Table II

TABLE II

| Resin | HLMI (g/10') | Density (g/cm³) | MI2 (g/10') | Mn kDa | Mw kDa | D |
|---|---|---|---|---|---|---|
| First reactor | | | | | | |
| R1 | 13.1 | 0.939 | — | 16.8 | 237 | 14.1 |
| R2 | 16.17 | 0.946 | — | 16.6 | 229 | 13.8 |
| R3 | 10.8 | 0.953 | 0.36 | | | |
| R4 | 14.4 | 0.959 | — | 16.7 | 218 | 13.1 |
| Second reactor | | | | | | |
| R1 | 13.23 | 0.939 | | 16.8 | 234 | 13.9 |
| R2 | 14.5 | 0.940 | 0.21 | 17.1 | 218 | 12.7 |
| R3 | 10.4 | 0.953 | 0.17 | 18.4 | 235 | 12.8 |
| R4 | 9.8 | 0.954 | 0.16 | 18.4 | 262 | 14.2 |

Resin samples were retrieved from both the first reactor and the second reactor. They were extruded on a small laboratory extruder to form pellets and the pellets were then extruded to produce films having a thickness of 50 microns. The gels absorb more light than the polyethylene film and they are thus detected above an absorption threshold, high absorption threshold meaning high detection sensitivity. The gel level was determined by sending a beam of light through the film and by measuring the light transmitted through said film with a digital camera. The equipment used was as follows:

The extruder to prepare the films was a Brabender E19/25D (table model) equipped with a 1.2 kW motor, a screw speed regulator of from 1 to 100 rpm, and three zones for temperature control of 1300 W each.

The light source was a halogen lamp DDL, cold light 150 W, 20 A equipped with an optical cross section converter.

The camera was a digital linear camera having a line length of 2048 pixels, each pixel having a dimension of 14 microns×14 microns, a dynamic range of 1000:1, a pixel frequency of 30 MHz, an inspection width of about 100 mm and a resolution of about 50 microns.

The image-processing unit was an Intel 586/133 MHz processor with a memory of 16 Mb RAM, a hard disk of 1.6 Gb, a graphic monitor VGA high resolution, 1024×768, low radiation, a capacity of 12,000,000 pixels/sec.

The results are summarised in Table III.

TABLE III

| Resin | Number of gels (number/m²) | Amount of gel (ppm) | Mean gel size (micron) |
|---|---|---|---|
| R1 from first reactor | 6900 | 190 | 148 |
| R1 from second reactor | 620 | 10.2 | 121 |
| R2 from first reactor | 4800 | 90 | 130 |
| R2 from second reactor | 760 | 14.7 | 128 |

It is observed that the fraction of film surface covered with gel or amount of gel in the first reactor is about 10 times larger than in the second reactor. It is therefore concluded that the gels found in the first reactor are not merely diluted by the product made in the second reactor but that they are destroyed by the polymerisation occurring in the second reactor.

Figure 2A:
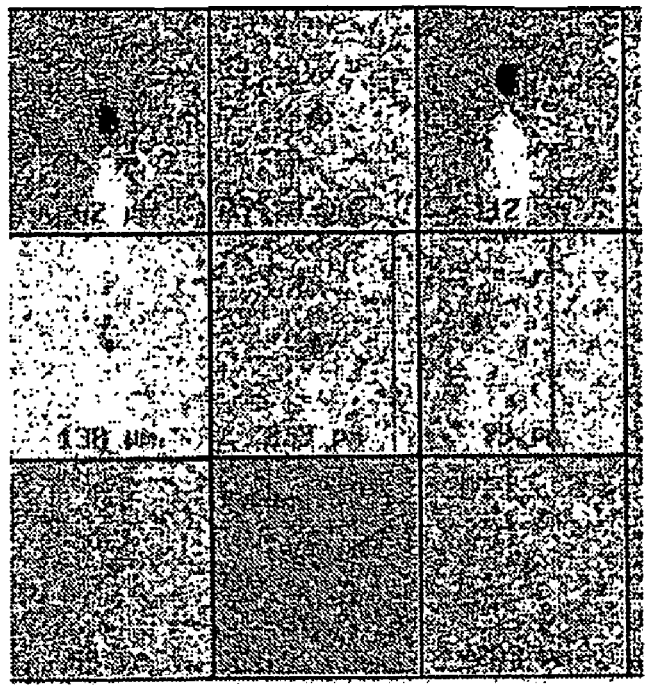
FIG. 2 represents a photograph of the gels in resin R1 retrieved respectively from the first (FIG. 2a) and from the second reactor (FIG. 2b).
Figure 2B:
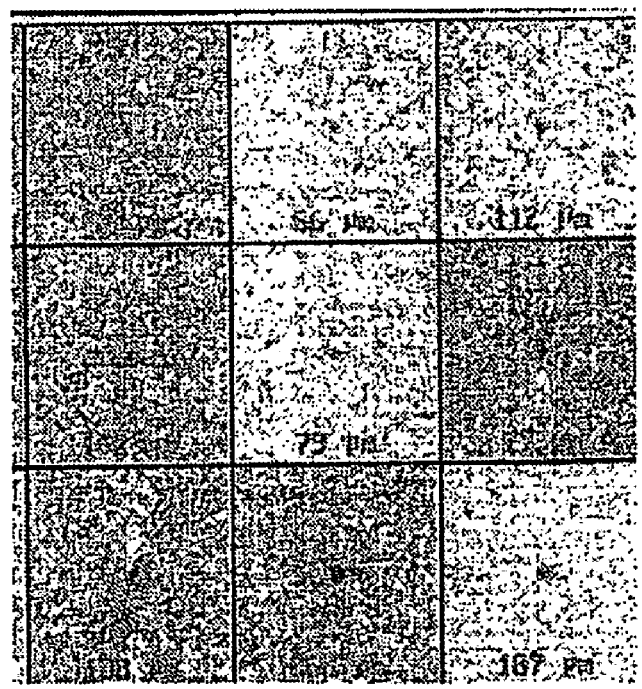

Without wishing to be bound by a theory, it is believed that this result is typical of the resins produced with a chromium-based catalyst system. It is believed that the gels created in the first reactor are partly caused by poorly reacted catalyst grains that are in or have just ended their induction period before polymerisation. This can be seen in FIG. 2 representing a photograph of the gels in resin R1 retrieved respectively from the first (FIG. 2*a*) and from the second reactor (FIG. 2*b*). One can see large catalyst residues in FIG. 2*a*, appearing as the white comet-shaped marks below the gels represented as black spherical marks. On FIG. 2*b* this phenomenon is significantly reduced for both the white comet-shaped marks and for the dark spherical marks.

Figure 3:
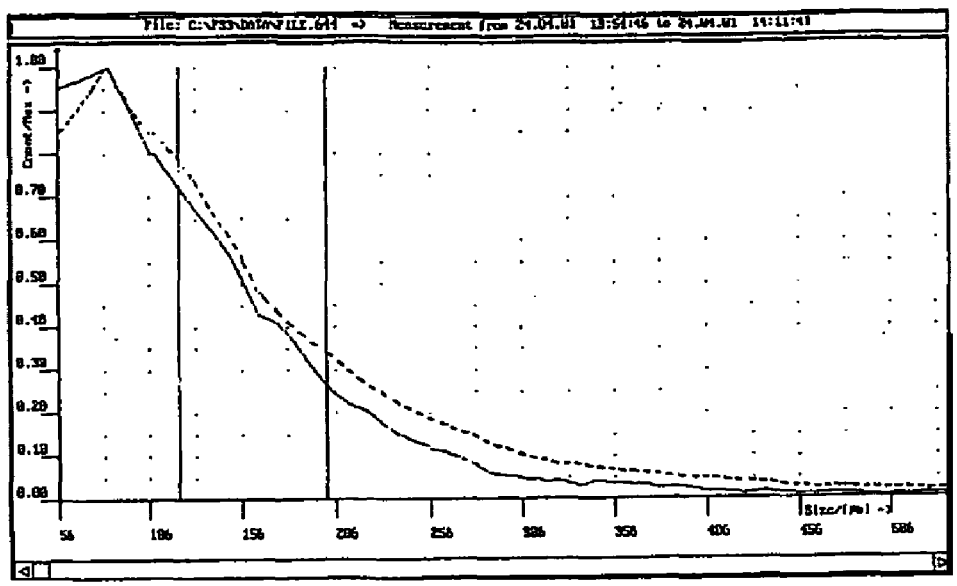
FIG. 3 represents the gel size distribution for resin R1: it is the number of counts as a function of size expressed in mm. The dashed line represents the resin exiting the first reactor and the solid line represents the resin exiting the second reactor.
Figure 4:
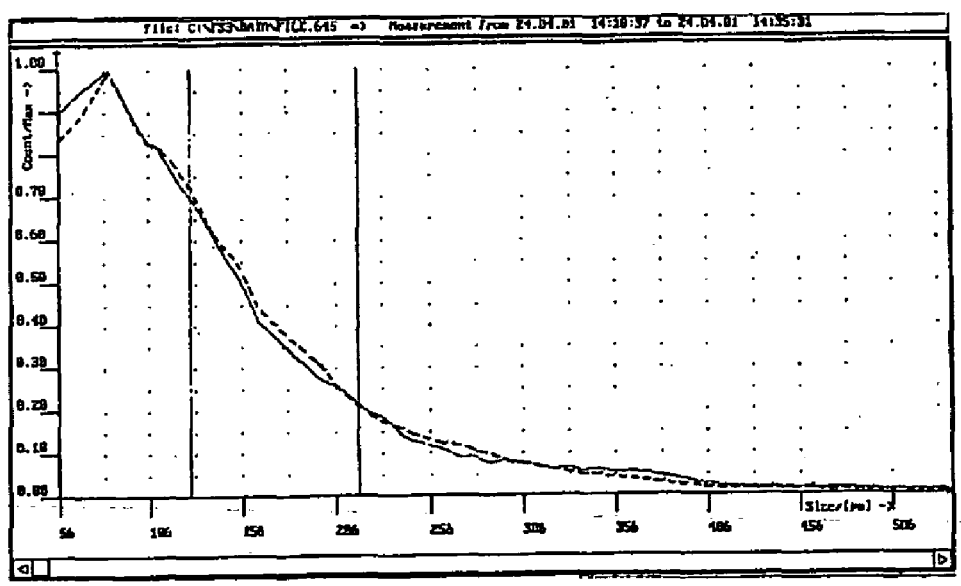
FIG. 4 represents the gel size distribution for resin R2: it is the number of counts as a function of size expressed in mm. The dashed line represents the resin exiting the first reactor and the solid line represents the resin exiting the second reactor.

The gel size distribution is represented in FIG. 3 for resin R1 and in FIG. 4 for resin R2. Comparing these two figures, it was observed that the monomodal resin R1 had a smaller gel size in the second reactor than in the first reactor whereas that behaviour was not observed for the bimodal resin R2. The gels had the same size distribution in both reactors for resin R2, although the overall gel content was decreased.

The invention claimed is:

1. A method for the polymerization of ethylene in a double loop reactor system comprising first and second interconnected loop reactors comprising:
    a) introducing an ethylene monomer, and a diluent carrier liquid into a first loop reactor of said reactor system;
    b) supplying a polymerization catalyst system comprising a supported chromium-based catalyst component to said first loop reactor;
    c) circulating said diluent liquid and ethylene monomer through said first loop reactor while polymerizing said ethylene monomer in the presence of said catalyst system to produce a slurry of polymer fluff particles in said diluent carrier liquid;
    d) withdrawing said slurry from said first loop reactor and supplying said withdrawn slurry to said second loop reactor;
    e) introducing an ethylene monomer and a diluent carrier liquid into said second loop reactor;
    f) circulating said diluent liquid and ethylene monomer through said second loop reactor while polymerizing said ethylene monomer in the presence of said catalyst system to produce a slurry of polymer particles in said diluent in said second reactor;
    g) controlling the polymerization conditions in said first and second reactors to produce a final ethylene polymer at a productivity of less than 3500 grams of polymer per gram of catalyst component and wherein said first and second reactors are operated under conditions such to produce a polymer having a mono modal polydispersity, such conditions comprising operating the first and second reactors at substantially the same temperature;
    h) recovering said ethylene polymer from said second loop reactor.

2. The method of claim 1 wherein said first and second reactors are operated under polymerization conditions to produce a productivity of less than 2500 grams of polymer per gram of catalyst component.

3. The method of claim 2 wherein the productivity of said polymerization reaction in said second reactor is less than the productivity of said polymerization reaction in said first reactor.

4. The method of claim 2 wherein said ethylene polymer is a homopolymer.

5. The method of claim 1 further comprising supplying a $C_{3+}$ olefin comonomer into said first and second reactors to produce a copolymer of ethylene and said alpha olefin comonomer.

6. The method of claim 5 wherein said alpha olefin comonomer has from 3 to 8 carbon atoms.

7. The method of claim 6 wherein said comonomer is 1-hexene.

8. The method of claim 1 further comprising processing the ethylene polymer recovered from a said second loop reactor to prepare a film having a gel content of no more than 30 ppm.

9. The method of claim 1 further comprising processing the ethylene polymer recovered from second loop reactor to prepare a film having a gel content of no more than 600 gels per square meter of said film.

10. The method of claim 1 wherein said supported catalyst component comprising a titania containing support and has a chromium content in the range of 0.5-5 weight percent.

11. The method of claim 10 wherein said catalyst component comprises at least 1 weight percent titania.

\* \* \* \* \*